(12) United States Patent
Brown et al.

(10) Patent No.: US 11,352,741 B2
(45) Date of Patent: Jun. 7, 2022

(54) AIR PERMEABLE COMPOSITE FOR SEATING APPLICATIONS METHODS

(71) Applicant: Sage Automotive Interiors, Inc., Greenville, SC (US)

(72) Inventors: David Michael Brown, Greenville, SC (US); Joshua D. Corley, Greer, SC (US)

(73) Assignee: Sage Automotive Interiors, Inc., Greenville, SC (US)

( * ) Notice: Subject to any disclaimer, the term of this patent is extended or adjusted under 35 U.S.C. 154(b) by 160 days.

(21) Appl. No.: 16/791,724

(22) Filed: Feb. 14, 2020

(65) Prior Publication Data

US 2020/0181834 A1 Jun. 11, 2020

Related U.S. Application Data

(63) Continuation of application No. 16/035,025, filed on Jul. 13, 2018, now Pat. No. 10,563,348.

(60) Provisional application No. 62/532,510, filed on Jul. 14, 2017.

(51) Int. Cl.
| | | |
|---|---|---|
| *D06N 3/00* | (2006.01) | |
| *B32B 5/26* | (2006.01) | |
| *B60N 2/58* | (2006.01) | |
| *B68G 7/05* | (2006.01) | |

(52) U.S. Cl.
CPC .............. *D06N 3/0011* (2013.01); *B32B 5/26* (2013.01); *B60N 2/58* (2013.01); *B68G 7/05* (2013.01); *D06N 3/00* (2013.01); *D06N 2209/123* (2013.01); *D06N 2211/14* (2013.01); *D06N 2213/04* (2013.01)

(58) Field of Classification Search
CPC .. D06N 3/0011; D06N 3/00; D06N 2209/123; D06N 2211/14; D06N 2213/04; B32B 5/26; B60N 2/58; B68G 7/05
USPC ......................................................... 156/290
See application file for complete search history.

(56) References Cited

U.S. PATENT DOCUMENTS

| | | | |
|---|---|---|---|
| 2007/0134464 A1* | 6/2007 | Schindzielorz | ...... B60N 2/5621 428/86 |
| 2007/0272385 A1 | 11/2007 | Quigley et al. | |
| 2014/0152057 A1 | 6/2014 | Truant et al. | |
| 2015/0299944 A1 | 10/2015 | Koji et al. | |
| 2015/0307670 A1 | 10/2015 | McNamara et al. | |

FOREIGN PATENT DOCUMENTS

| | | |
|---|---|---|
| CN | 101005944 A | 7/2007 |
| CN | 106715122 A | 6/2017 |
| DE | 112005000946 T5 | 7/2007 |
| DE | 102012011221 A1 | 8/2013 |
| JP | 2005052298 A | 3/2005 |

(Continued)

OTHER PUBLICATIONS

International Search Report and Written Opinion dated Oct. 2, 2018 in co-pending Patent Cooperation Treaty (PCT) application Serial No. PCT/US2018/042061.

(Continued)

*Primary Examiner* — Brent T O'Hern
(74) *Attorney, Agent, or Firm* — Fox Rothschild LLP (57) ABSTRACT

Methods for forming a composite by combining a perforated face layer and a backing scrim to make a material having sufficient airflow, tear strength and aesthetic features applicable to seating.

20 Claims, 8 Drawing Sheets

(56) References Cited

FOREIGN PATENT DOCUMENTS

| JP | 2007538162 A | 12/2007 |
| JP | 2016078628 A | 6/2016 |
| JP | 2016129994 A | 7/2016 |
| JP | S63139147 U | 7/2016 |
| WO | 2014097999 A1 | 6/2014 |
| WO | 2016061581 A1 | 4/2016 |

OTHER PUBLICATIONS

Japanese Office Action dated Apr. 13, 2021 in counterpart Japanese Patent Application Ser. No. 2020-501340.
Chinese Office Action dated Apr. 14, 2021 in counterpart Chinese Patent Application Ser. No. 201880045915.0.
European Search Report dated Mar. 12, 2021 in counterpart Eurpoean Patent Application Ser. No. 18831988.3.

* cited by examiner

AIR PERMEABLE COMPOSITE FOR SEATING APPLICATIONS METHODS

BACKGROUND

The present invention relates generally to perforated, nonwoven suedes. More particularly, the present invention relates to imparting airflow and aesthetic features to these materials.

Currently, the seating application market offers nonwoven suedes that include holes, namely, perforations. These suedes are required to meet a certain airflow specification through the perforations, when used in a heated and/or cooled seat.

The size and population of the perforations, or, perforation holes, can affect the airflow positively or negatively. Not only is airflow at issue, the perforation features may limit the ability to impart aesthetics to the overall material. For example, decorative scrims can be included on the back of the perforation to show an aesthetic through the perforation hole (color, texture, etc).

However, prior efforts have shown that when a decorative scrim is added to the back of perforated materials (regardless of the perforation population and hole size), air flow is limited through the composite. The present typical composites of perforated face and decorative backing materials result in air permeability through the perforation holes that is significantly lower than most standards, including as low as 20 CFM (cubic feet per minute).

Accordingly, there remains a need to provide an air permeable decorative backing scrim that can also impart aesthetic features to perforated materials.

SUMMARY OF THE INVENTION

The following presents a simplified summary of the invention in order to provide a basic understanding of some aspects of the invention. This summary is not an extensive overview of the invention. It is not intended to identify key or critical elements of the invention and/or to delineate the scope of the invention, but instead to present concepts of the invention in a simplified form as an introduction to the more detailed description that is subsequently presented below.

The present invention may include a material used in seating applications. In one embodiment of the present invention, the material may include a backing material that is breathable and/or that allows the flow of air. In another embodiment of the present invention, the material may be a breathable backing scrim layer applied to a perforated layer to form a composite material for use in seating applications. In yet another embodiment, the present invention may include a seating composite material including a perforated, nonwoven layer of suede that is adhered to a breathable backing scrim having an aesthetic feature, such as color. In still another embodiment of the present invention, the a composite material may include breathable layers that may be combined through an adhesive, such as a spun-laced adhesive, a web, heat activated adhesive, or a powder adhesive.

The present invention may also include a method for making a material. In one embodiment of the present invention, the method may include the steps of: providing a breathable surface layer; providing a breathable backing scrim layer; and adhering the surface layer to the backing scrim layer to form a breathable composite material for use in seating applications.

The present invention may also include a seating material for use in seating applications, having a face layer having an array of perforations adapted for airflow therethrough together with a backing layer having an aesthetic feature that is adhered or laminated to the face layer to form a breathable composite material adapted to allow sufficient airflow therethrough for seating.

The present invention may further comprise a method for making a seating material for use in seating application, including providing a face layer having an array of perforations adapted for airflow therethrough and providing a backing layer that has an aesthetic feature that is visible through the perforations, and additionally, adhering or laminating the backing layer to the face layer to form a composite material that is breathable and adapted to allow sufficient airflow therethrough for use in seating applications.

Other features and their advantages will be readily apparent to those skilled in the arts, techniques and equipment relevant to the present invention from a careful reading of the Detailed Description of Embodiments.

DETAILED DESCRIPTION OF EMBODIMENTS

Figure 1:
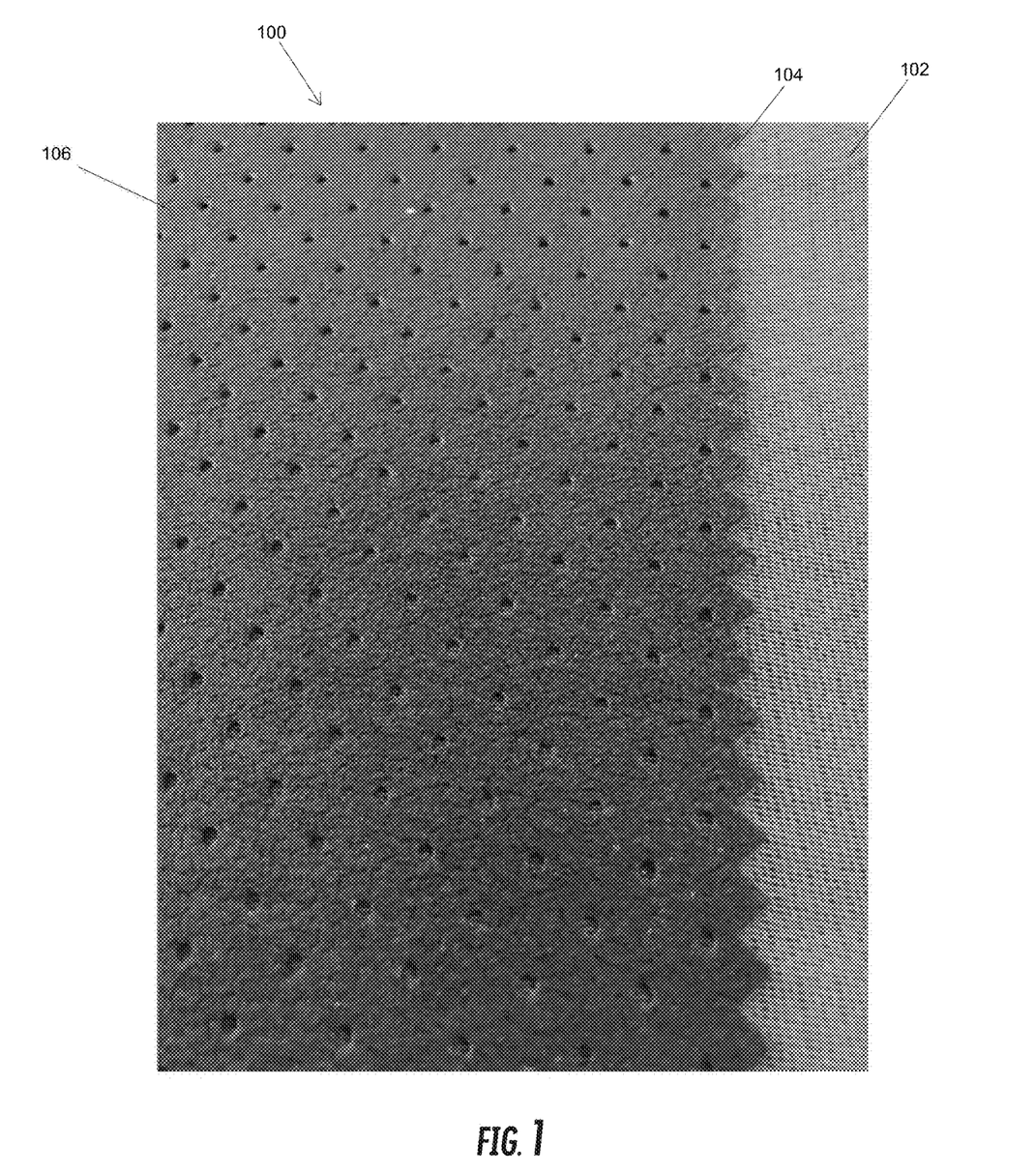
FIG. 1 is photograph of a composite material incorporating a decorative backing according to an embodiment of the present invention.
Figure 2:
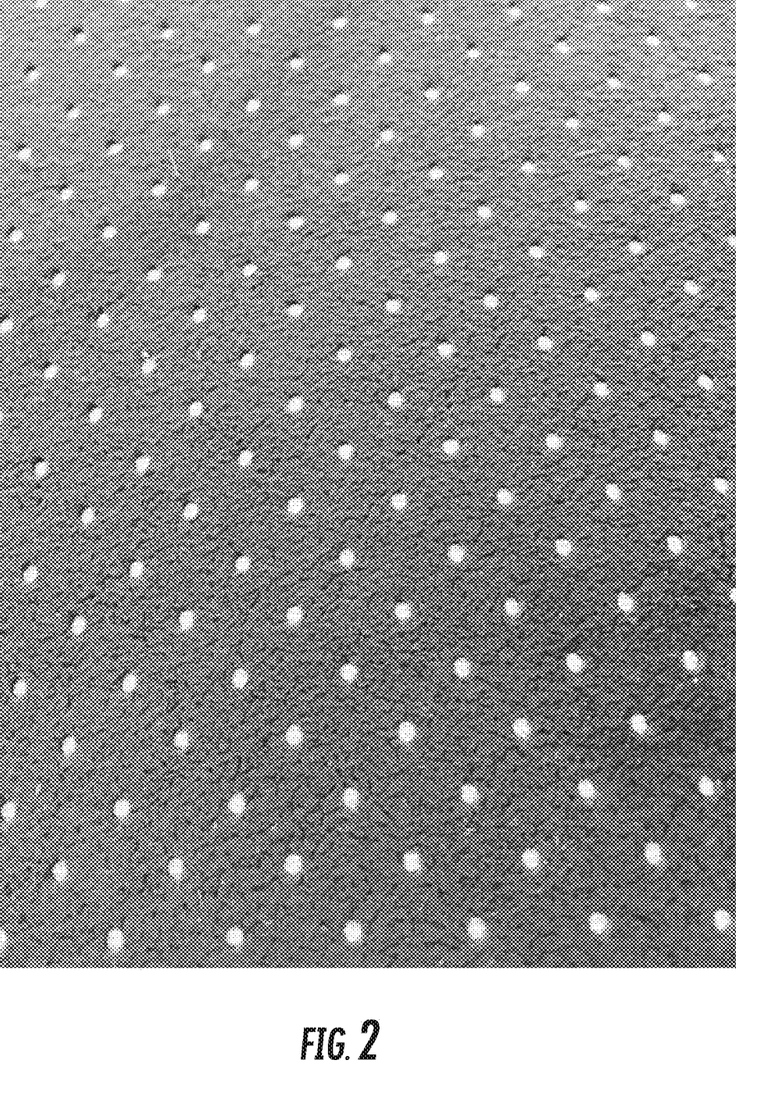
FIG. 2 is a photograph of a composite material incorporating a decorating backing according to an embodiment of the present invention.
Figure 3:
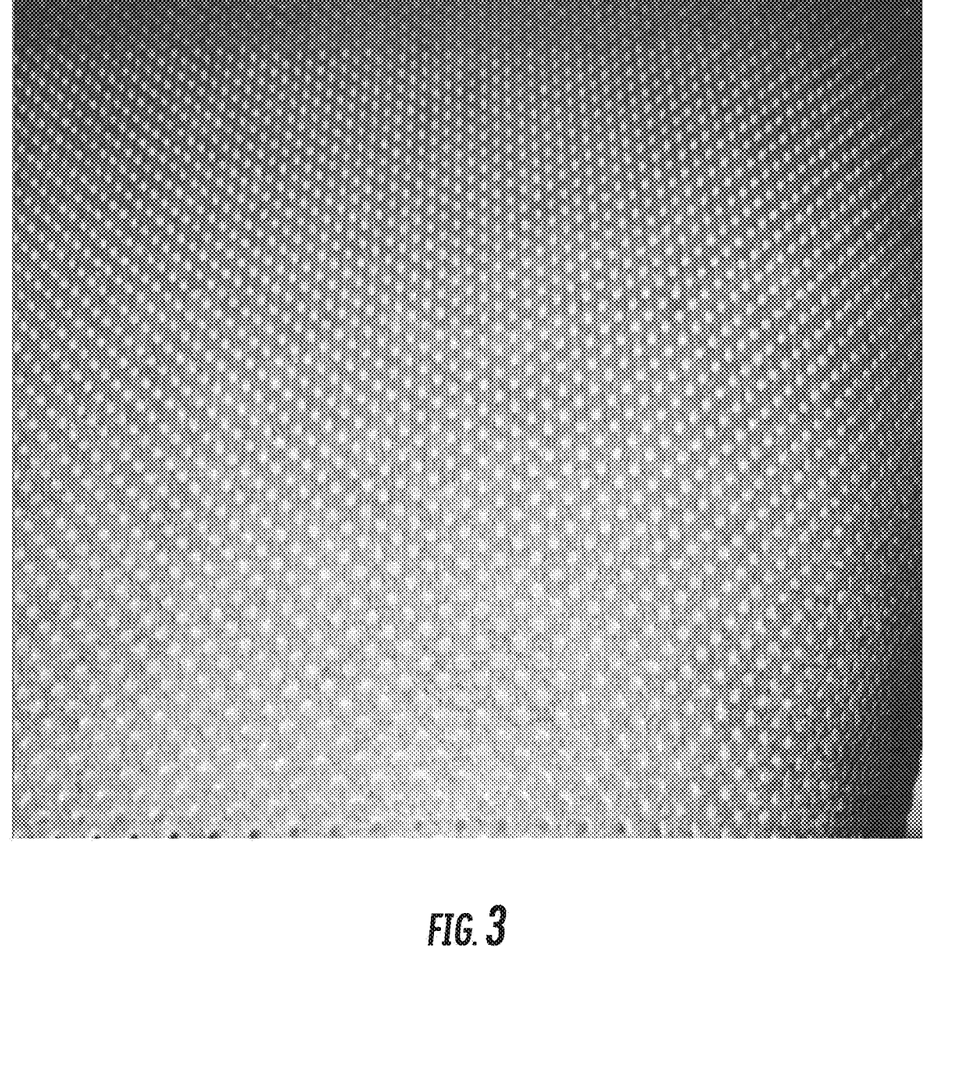
FIG. 3 is a photograph of a perforated material according to an embodiment of the present invention.
Figure 4:
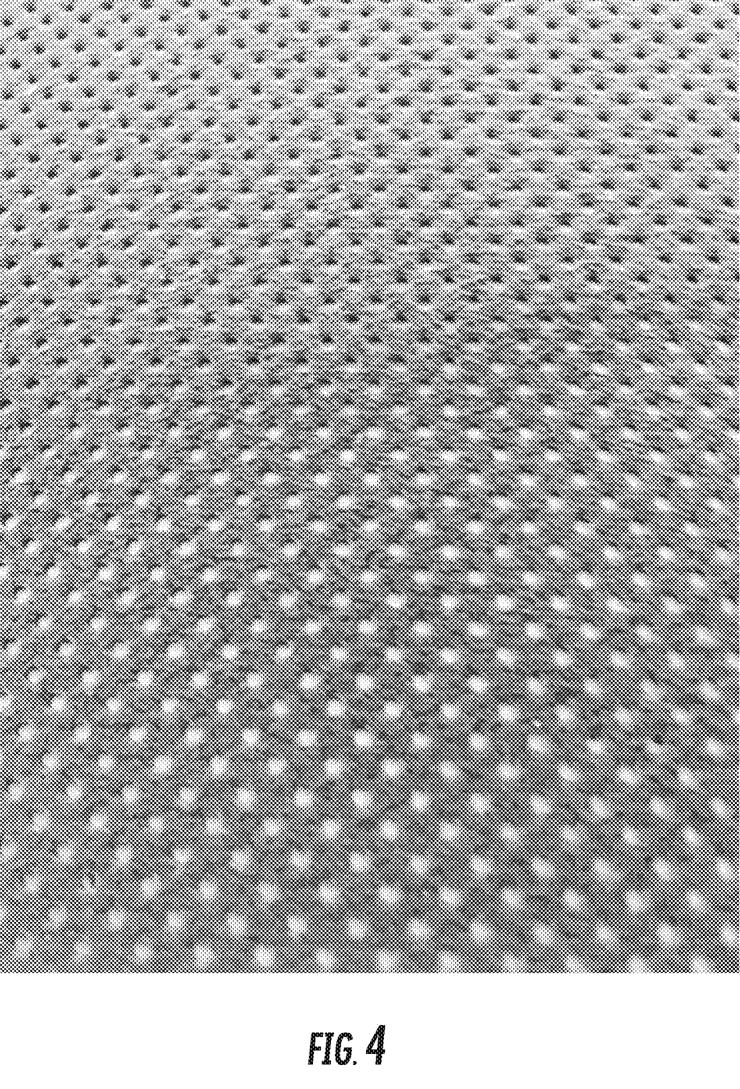
FIG. 4 is a photograph of a perforated material according to an embodiment of the present invention.
Figure 5:
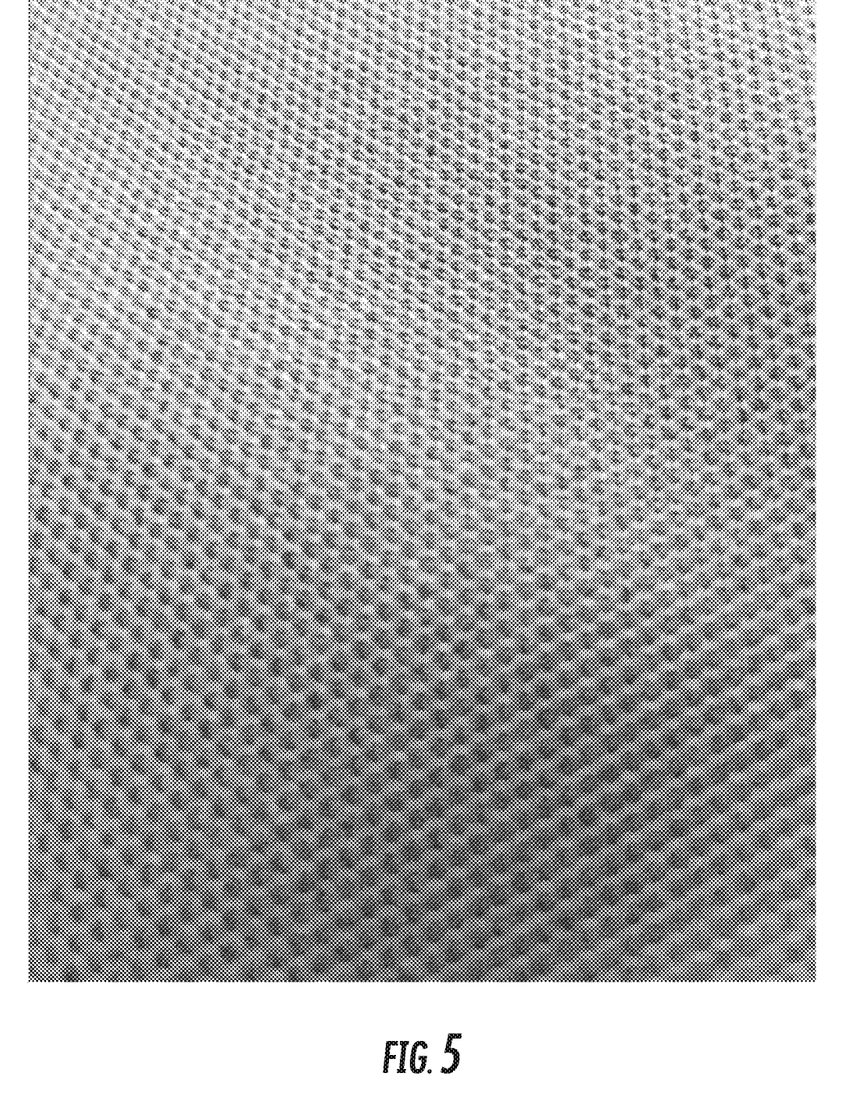
FIG. 5 is a photograph of a breathable backing material according to an embodiment of the present invention.
Figure 6:
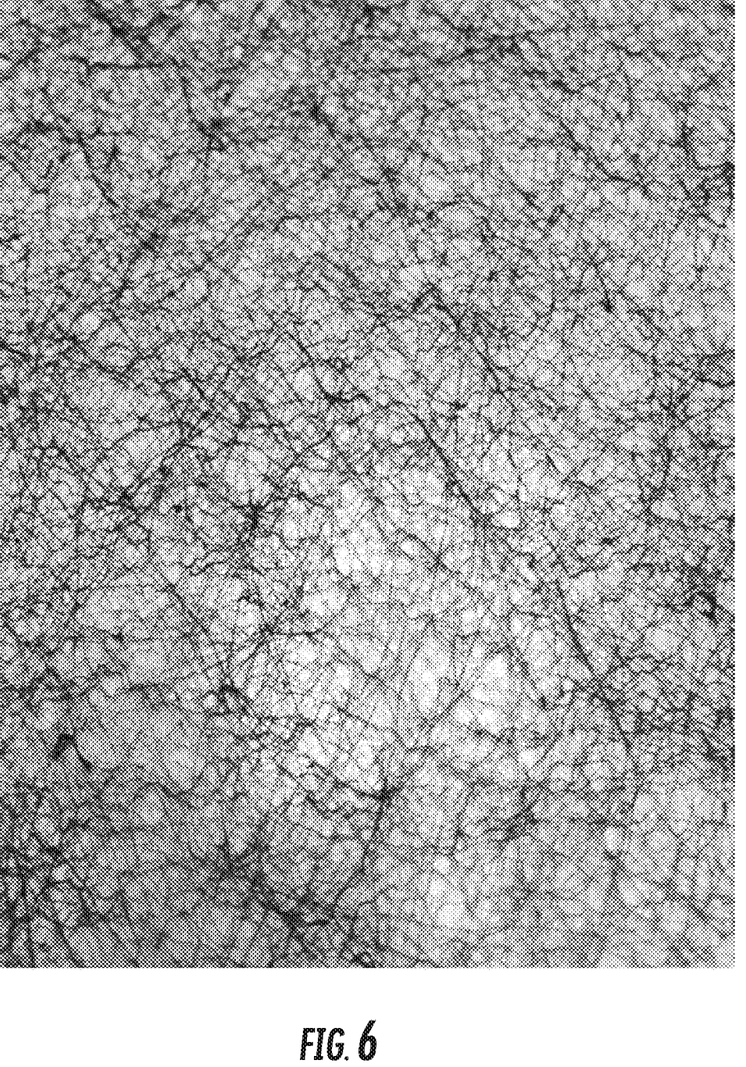
FIG. 6 is a photograph of an adhesive web according to an embodiment of the present invention.
Figure 7:
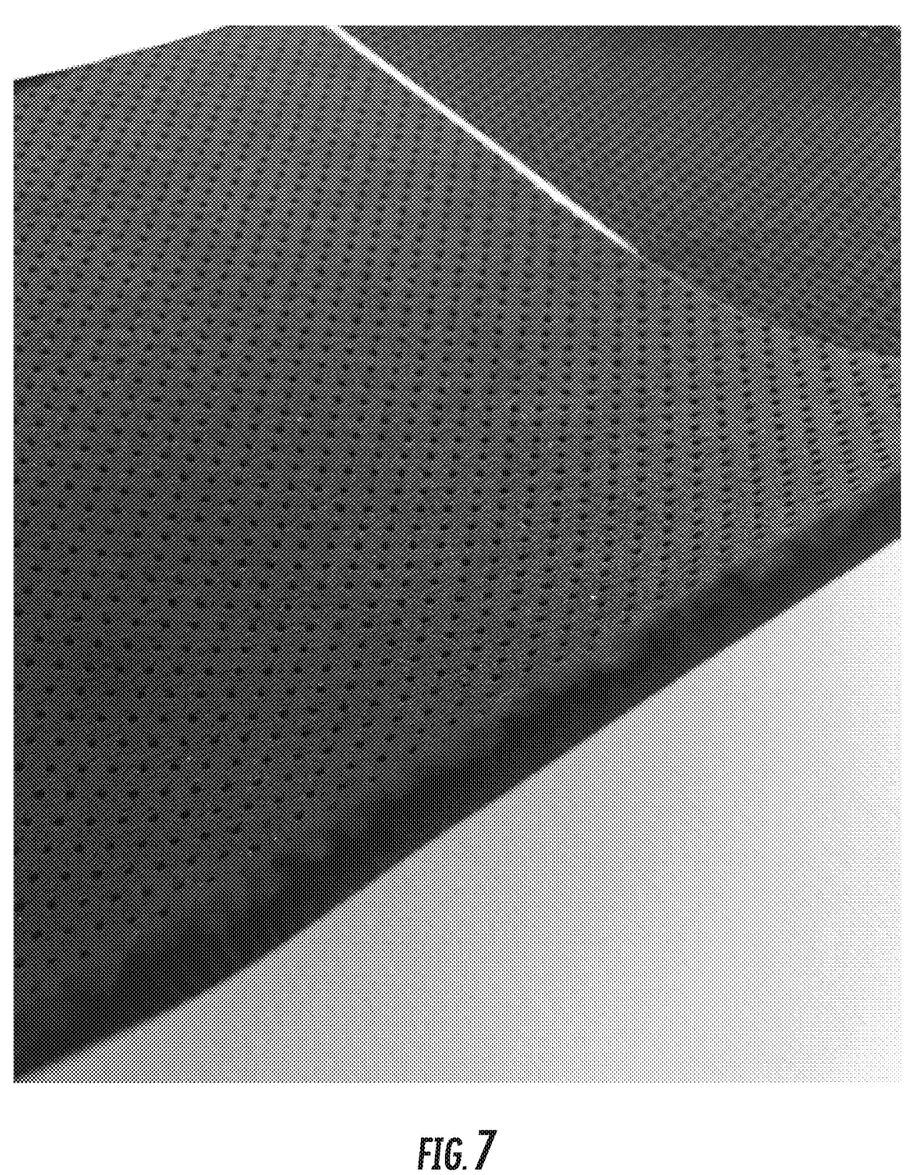
FIG. 7 is a photograph of a composite material according to an embodiment of the present invention.
Figure 8:
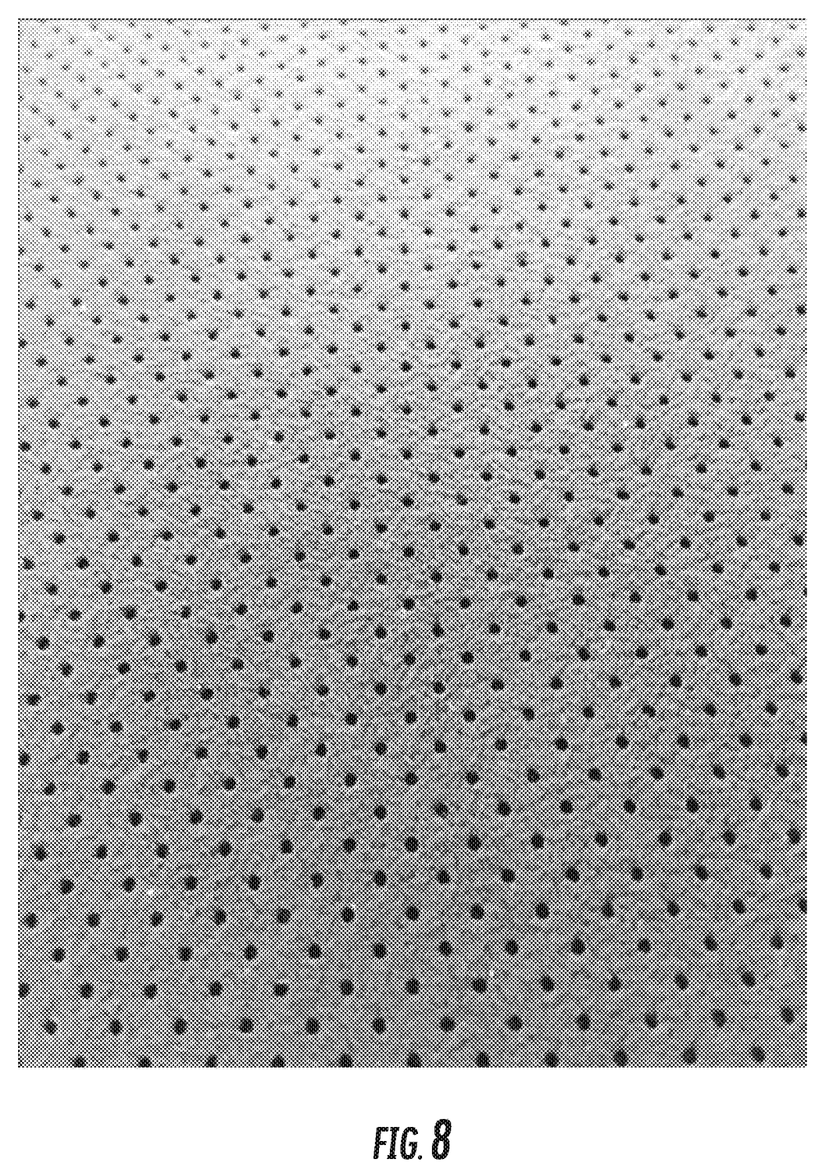
FIG. 8 is a photograph of a composite material according to an embodiment of the present invention.

The present invention includes materials, methods, and systems relating to seating products. Alternative embodiments of the present invention are illustrated in FIGS. 1-8 and described more fully below.

The present invention may include a seating material. In one embodiment of the present invention, the seating material may be breathable and/or allows the flow of air. As used here, the term "breathable" refers to a material that is sufficiently air permeable and/or allows a sufficient volume of air to pass through at a suitable rate for use in seating applications. In one embodiment of the present invention, a seating material is sufficiently air permeable or "breathable" if it is has an overall airflow of about 115 $ft^3/min/ft^2$ (CFM) or more, including all combined layers to the extent there are more than one.

In another embodiment, the seating material may have a suitable tear strength. For example, the seating material may have a trapezoidal ("trap") tear strength that is about 50 N (Newtons ($kg \cdot m/s^2$)) or more for a single material, or about 100 N or more for a composite material.

In another embodiment of the present invention, the seating material may be a breathable backing scrim layer that may be applied to a breathable surface layer, such as a perforated layer, to form a breathable composite material for use in seating applications. By way of example, a breathable surface layer may have airflow of about 250 CFM or more. In another example, a breathable surface layer may be at least 322 CFM.

In yet another embodiment, the present invention may include a seating composite material that may have a perforated, nonwoven layer of suede adhered to a breathable backing scrim, which may have an aesthetic feature such as color. By way of example, a breathable backing scrim may have airflow of about 400 CFM or more. In another example, a breathable surface layer may be at least 500 CFM.

In still another embodiment of the present invention, the breathable composite material layers may be combined by an adhesive web, spun laced adhesive, heat activated adhesive, or a powder adhesive, any of which would need to maintain sufficient breathability regarding the overall composite material. By way of example, a breathable composite material may be at least 115 CFM. In another example, a breathable composite material may be at least 125 CFM.

The present invention may also include a method for making a breathable seating material. In one embodiment of the present invention, the method may include the steps of: providing a breathable surface layer; providing a breathable backing scrim layer; and adhering the surface layer to the backing scrim layer to form a breathable composite material for use in seating applications.

In one exemplary embodiment, the material includes a breathable decorative scrim that may be attached to additional layers to form an overall, composite seating material. For example, when attached to a perforated suede with a proper adhesive, the perforated composite can provide suitable airflow and further display through the perforations such aesthetic features as color.

In another exemplary embodiment, the present invention includes a preferred balance of the composite (perforated suede+adhesive+specially constructed decorative backing material) that uniquely enables the creation of an aesthetic.

In yet another exemplary embodiment, the present invention includes a composite having a face layer and a backing layer that are combined by an adhesive layer. One example of a face layer of the composite may include the Sage Automotive, Inc. (of Greenville, S.C. USA) nonwoven Dinamica® automotive suede product that is perforated (with certain hole size, density, and population of holes). Alternatively, the face layer may include other suedes and leathers. In this embodiment, the face layer may have airflow of about 200 CFM or more. In another example, the face layer may have airflow between about 200 CFM and about 400 CFM.

The backing layer may be a breathable decorative scrim, which may be a knit material. One exemplary embodiment may include a headliner warp knit material. Alternatively, the material may be a breathable circular knit. In still another alternative, the breathable decorative scrim has a certain trap tear strength, as well as airflow. In yet another embodiment, the scrim may have a structure that is woven, or nonwoven, but is sufficiently breathable for use in seating applications. In this embodiment, the backing layer may have airflow of about 300 CFM or more. In another embodiment, the backing layer may have airflow between about 300 CFM and about 600 CFM.

In another embodiment, a breathable composite material may be formed by a face layer of perforated material having an airflow of about 322 CFM adhered to a backing scrim layer having an airflow of about 563 CFM for form a composite having an overall airflow of about 142 CFM.

The present invention may also include the option for a standalone material that is tack sewn versus attached to a spacer or backing layer. For example, such material may be formed by directly laminating spacer fabric to perforation designs, without backing scrim. In this instance, the standalone material is preferably sufficiently breathable for use seating applications.

In another embodiment of the present invention, a composite material may include a surface layer having perforations and a breathable decorative backing scrim that may be a knit material, such as a circular knit construction and that further may allow the color of the decorative backing scrim showing through the perforations, while the required airflow through the composite is maintained. The composite may be made by alternative methods, including by having the material tack sewn or attached to a spacer backing or laminate to work in seating applications that require an air flow/permeability specification to be met.

A feature of the present invention includes a decorative seating material that possesses holes permitting sufficient airflow or that is breathable. In prior methods utilizing high level of perforation hole size, density, and population, the resulting material would not satisfy tear strength requirements. In the present invention, a spacer, including a knit fabric, such as a double needle bar knit spacer fabric, or other backing may be used to enhance tear strength.

In still another embodiment, the present invention may include a face fabric, such as a perforated nonwoven suede; a specially constructed decorative backing scrim; and an adhesive to combine the layers that together form a composite material that is breathable for seating applications.

In one exemplary embodiment, a backing scrim may be used, which may include a spacer, such as a double needle bar knit spacer fabric, that is attached or laminated to a heated and/or cooled seating material. In another embodiment, a foam and scrim may be used provided sufficient airflow is achieved.

In still another embodiment, the adhesive may be spun lace or powder—scatter lamination. Alternatively, other means of laminating the composite layers without adversely affecting the airflow may be used. In another embodiment, the adhesive layer or component, if used, may provide sufficient bond strength so that the layers being combined do not readily peel apart or become disengaged.

A feature of the present invention includes a decorative seating material that possesses holes permitting sufficient airflow or that is breathable. In prior methods utilizing high level of perforation hole size, density, and population, the resulting material would not satisfy tear strength requirements. In the present invention, a spacer or backing scrim, which may include a knit fabric, such as a double needle bar knit spacer fabric, or other backing may be used to enhance tear strength. This increased tear strength is balanced by a material having an effective porosity to impart sufficient airflow to the composite material. Important components to air permeability may be population of the perforated dots affects, air permeability of the adhesive, and air permeability of the specially constructed decorative scrim.

In FIGS. 1-8, photographs of exemplary components of a composite according to an embodiment of the present invention are shown. In one exemplary embodiment, the present invention may include a seating material that is a composite of a surface layer and a decorative backing layer that are bonded or adhered to form a breathable layer for use in seating applications. In this exemplary embodiment, the seating material may include an airflow that is at least 115 ft$^3$/min/ft$^2$, and wherein the trap tear strength is about 100 N or more.

In another exemplary embodiment, the present invention may include a composite material having a layer of backing scrim that has an airflow in the range of about 300 to about 600 CFM, and a face layer that has an airflow in the range of about 200 to about 400 CFM, which are combined with an adhesive so that together the airflow of the composite is at least 115 CFM or more.

In still another exemplary embodiment, the present invention includes a composite material that combines a backing scrim layer with a face fabric layer by an adhesive. In one example, the backing scrim is greater than 400 CFM and the face layer is greater than 250 CFM.

In yet another exemplary embodiment, the present invention includes a composite material that combines a backing scrim layer with a face fabric layer by an adhesive. In one example, the backing scrim is greater than 500 CFM and the face layer is greater than 300 CFM.

In still another exemplary embodiment, the present invention includes a composite material that combines a backing scrim layer with a face fabric layer by an adhesive. In one example, the backing scrim is about 563 CFM and the face fabric is about 322 CFM, and when combined, these layers form a composite that is about 142 CFM.

Features of one or more examples of alternative embodiments of the present invention compared to commercially available materials are shown below.

TABLE 1

Air permeability data on alternative perforated face layers.
Air Permeability Data on Sage/Miko Dinamica Perforations

| Minimum Specification: Sage Miko Dinamica Auto Perforation Testing | Ford Study Minimum: 115 CFM (cubic feet/minute/square feet) Test Method: ASTM D737 at 125 Pascal static pressure |
|---|---|
| | Avg. #38 Orifice |
| Perf. 914 | |
| 1. Suede Only No Perforation: | 8.14 |
| 2. Suede Only Perf 914: | 90 |
| 3. Suede Perf. 914 w/decorative fw AJ4 backing: | 27.8 |
| 4. Suede Perf. 914 w/dec. fw AJ4 backing + 8 mm 1.7 + ck scrim: | 19.5 |
| 5. Suede Perf. 914 w/dec. fw Blk backing + 10 mm 1.7 + ck scrim: | 16.3 |
| 6. Suede Perf. 914 w/decorative fw Silver Metallic backing (May 2016): | 27.1 |
| Perf. 510 | |
| 1. Suede Only no Perforation: | 8.14 |
| 2. Suede Only Perf 510: | 142 |
| 3. Suede Perf. 610 w/3 mm 1.7 | 83.4 |
| 4. Suede Perf. 510 w/3 mm HD + CK | 32.8 |
| 5. Suede Perf. 510 w/8 mm 1.7 + ck scrim: | 59.8 |
| 6. Suede Perf 510: with Reflective Silver backing (November 2016) | 0 |
| New Perforation: | |
| 1. New Mirco Perf. 412 | 322 |
| 2. New Micro Perf. 410 | 223 |
| 3. New Mini Perf. 512 | 198 |
| 4. Suede Only Perf 712 | 155 |
| 6. New Micro Perf. IPS 11 | 323 |
| 7. New Mini Perf. IPS 8 | 179 |

TABLE 2

Air permeability and tear strength of alternative circular knit backing scrim layers.

| 8032796/Lab RT0183 | 946114-001 Specification/Min. | Initial Trial Decorative Backing Scrim Results |
|---|---|---|
| Ford Ford WSSM8P18-B1-B4 Sep. 11, 2013 (Spec Section or test method listed) Avg. #38 Orifice | | |
| Air Perm - Test Method: ASTM D737 at 125 Pascal static pressure | 115 CFM (cubic feet/minute/square feet) | 593 |
| Tear Strength (Trapezoid) 3.7.5 Warp | 40 Newtons | 17.9 |
| Tear Strength (Trapezoid) 3.7.5 Fill | 40 Newtons | 24.04 |
| Stretch & Set 3.10.1 Warp | Report % | 64.1/14.9 |
| Stretch & Set 3.10.1 Fill | Report % | 76.7/24.1 |
| 8032858/Lab RT0184 Ford Test: | 946366-007 | Current Breathable Decorative Backing Scrim |
| Air Perm - Test Method: ASTM D737 at 125 Pascal static pressure | 115 CFM (cubic feet/minute/square feet) | 501 |

TABLE 2-continued

Air permeability and tear strength of alternative circular knit backing scrim layers.

| 8032796/Lab RT0183 | 946114-001 Specification/Min. | Initial Trial Decorative Backing Scrim Results |
|---|---|---|
| Tear Strength (Trapezoid) 3.7.5 Warp | 40 Newtons | 63.4 |
| Tear Strength (Trapezoid) 3.7.5 Fill | 40 Newtons | 54.01 |
| Stretch & Set 3.10.1 Warp | Report % | 42.5/5.7 |
| Stretch & Set 3.10.1 Fill | Report % | 62.3/14.1 |

TABLE 3

Air permeability and tear strength of alternative perforated face layers.
New Perforation testing-ZHE Dinamica Auto - Miko Novwoven Suede Material

| | | Mini | Enhanced Mini | Enhanced Mini | Enhanced Micro | Enhanced Micro | Enhanced Micro |
|---|---|---|---|---|---|---|---|
| Perforation | | 510 | IPS 8 | 512 | IPS 11 (412 similar) | 412 | 410 |
| Lot # | | P1514E62A | 8032339 | P1613E102B | 8032341 | 1613E102B | 1613E102B |
| Lab # Ford Ford WSSM8P18-B1-B4 Sep. 11, 2013 (Spec Section or test method listed) | | DT0456 | DT0455 | DT0458 | DT0457 | DT045B | DT0459 |
| Ford Test: | Specification/Min. | | | | | | |
| Air Perm - Test Method: ASTM D737 at 125 Pascal static pressure. Avg. # 38 Orifice | 125 CFM (cubic feet/minute/square feet) | 143/145/144 | 180/179/179 | 183/180/182 | 323/322/326 | 323/322/323 | 215/218/215 |
| Velcro 3.7.9 | 4 rating | 4.4.4 | 4.4.4 | 4.4.4 | 4.4.4 | 4.4.4 | 4.4.4 |
| Taber Snagging 3.8.7.1 | 4 rating | 4.4 | 4.4 | 4.4 | 4.4 | 4.4 | 4.4 |
| Seam Strength 3.7.3W | 310 Newtons | 334.1 | 312.7 | 265.5 | 193 | 217.5 | 263.2 |
| Seam Strength 3.7.3 F | 310 Newtons | 404.3 | 334 | 315.5 | 139.7 | 203.2 | 247.7 |
| Tear Strength (Trapezoid) 3.7.5 Warp | 100 Newtons | 46.3 | 44.9 | 42.2 | 25 | 32.1 | 41.8 |
| Tear Strength (Trapezoid) 3.7.5 Fill | 100 Newtons | 50 | 32.2 | 38.6 | 20.3 | 31.2 | 36.7 |
| Breaking Strength 3.7.1 Tensile Warp | 400 Newtons | 305.3 | 283.4 | 276.8 | 174 | 197.8 | 241.6 |
| Breaking Strength 3.7.1 Tensile Fill | 400 Newtons | 380.4 | 310.6 | 299.9 | 144.1 | 184.6 | 237 |

These results indicate that selecting the appropriate porosity of a backing layer, and combining that layer with a suitable face layer, such as one having a preferred array and size of perforations, may impact the overall breathability and strength of the composite material. Air permeability, trap tear strength, and breaking strength of the present invention are balanced to achieve a breathable, decorative, and functioning seating material.

The present invention may also include a method for making a composite such as described herein. In one embodiment of the present invention, perforation equipment to punch holes in a face layer of the composite may be provided. Adhesive lamination to combine the layers may also be provided. Next, a perforated face layer may be formed. A backing layer may be formed. Lastly, a composite of the perforated face layer and the backing layer may be formed by combining the layers with an adhesive component. In one exemplary embodiment, the adhesive component may be heat activated adhesive, spun laced adhesive, powder lamination, or another suitable adhesive material that maintains sufficient airflow and bond strength.

In another exemplary embodiment of the present invention, process parameters may enable the making of a composite seating material such as described herein. For example, certain parameters may be used to enhance abrasion, flammability, seam strength, tear strength, tensile strength of a composite material for seating.

Those skilled in the relevant arts will appreciate from the foregoing description of preferred embodiments that substitutions and modification can be made without departing from the spirit and scope of the invention, which is defined by the appended claims.

What is claimed is:

1. A method for making a seating material for use in seating applications, comprising the steps of:
   providing a face layer having an array of perforations adapted for airflow therethrough, said face layer having a seating surface and a back surface opposite said seating surface;
   providing an adhesive layer;
   providing a breathable scrim backing layer that has an aesthetic feature that is visible through said perforations;
   adhering or laminating said breathable scrim backing layer to said adhesive layer; and
   adhering or laminating said face layer to said adhesive layer to form a composite material that is breathable and adapted to allow sufficient airflow therethrough for use in seating applications and wherein said breathable scrim backing layer is visible through said perforations from said seating surface of said face layer.

2. The method as recited in claim 1, wherein said face layer is adapted for heating and cooled airflow therethrough.

3. The method as recited in claim 1, wherein said composite material has an airflow of about 200 CFM or more.

4. The method as recited in claim 1, wherein said face layer is adapted to allow an airflow therethrough that is between about 200 CFM and about 400 CFM.

5. The method as recited in claim 1, wherein said face layer is adapted to allow an airflow therethrough of about 250 CFM or more.

6. The method as recited in claim 1, wherein said face layer is adapted to allow an airflow therethrough of at least 300 CFM.

7. The method as recited in claim 1, wherein said face layer is suede.

8. The method as recited in claim 1, wherein said breathable scrim backing layer is adapted to allow an airflow therethrough of about 300 CFM or more.

9. The method as recited in claim 1, wherein said breathable scrim backing layer is adapted to allow an airflow therethrough of between about 300 CFM and about 600 CFM.

10. The method as recited in claim 1, wherein said breathable scrim backing layer is adapted to allow an airflow therethrough of about 400 CFM or more.

11. The method as recited in claim 1, wherein said breathable scrim backing layer is adapted to allow an airflow therethrough of at least 500 CFM.

12. The method as recited in claim 1, wherein said composite material is adapted to allow an airflow therethrough of about 115 CFM or more.

13. The method as recited in claim 1, wherein said composite material is adapted to allow an airflow therethrough of about 142 CFM.

14. The method as recited in claim 1, wherein said aesthetic feature is a color.

15. The method as recited in claim 1, wherein said composite material has a trap tear strength of about 100 N or more.

16. The method as recited in claim 1, wherein said composite material has a tear strength of about 100 N or more.

17. A method for making a seating material for use in seating applications, comprising the steps of:

providing a face layer having an array of perforations adapted for allowing heated and cooled airflow therethrough, said face layer having a seating surface and a back surface opposite said seating surface;

providing an adhesive layer;

providing a breathable scrim backing layer that has an aesthetic feature that is visible through said perforations and is adapted for allowing;

adhering or laminating said breathable scrim backing layer to said adhesive layer; and adhering or laminating said face layer to said adhesive layer to form a composite material that:
is breathable and adapted to allow sufficient airflow therethrough for use in seating applications; and
has a tear strength of about 100 N or more; and wherein said breathable scrim backing layer is visible through said perforations from said seating surface of said face layer.

18. The method as recited in claim 17, wherein said composite material is adapted to allow an airflow therethrough of about 115 CFM or more.

19. A method for making a seating material for use in seating applications, comprising the steps of:

providing a face layer having an array of perforations adapted for allowing heated and cooled airflow therethrough of about 200 CFM or more, said face layer having a seating surface and a back surface opposite said seating surface;

providing an adhesive layer;

providing a breathable scrim backing layer that has an aesthetic feature that is visible through said perforations and is adapted for allowing an airflow therethrough of about 300 CFM or more;

adhering or laminating said breathable scrim backing layer to said adhesive layer; and adhering or laminating said face layer to said adhesive layer to form a composite material that is breathable and adapted to allow an airflow therethrough, wherein said breathable scrim backing layer is visible through said perforations from said seating surface of said face layer.

20. The method as recited in claim 19, wherein said composite material has a tear strength of about 100 N or more.

* * * * *